(12) United States Patent
Terashima et al.

(10) Patent No.: US 10,283,884 B2
(45) Date of Patent: May 7, 2019

(54) ELECTRIC CONNECTION STRUCTURE, GLASS PLATE WITH TERMINAL, AND METHOD FOR MANUFACTURING GLASS PLATE WITH TERMINAL

(71) Applicants: AGC INC., Tokyo (JP); Junichi Nakaoka, Tokyo (JP)

(72) Inventors: Fumitaka Terashima, Tokyo (JP); Hidehiko Watanabe, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 15/969,066

(22) Filed: May 2, 2018

(65) Prior Publication Data

US 2018/0254570 A1 Sep. 6, 2018

Related U.S. Application Data

(63) Continuation of application No. PCT/JP2016/082864, filed on Nov. 4, 2016.

(30) Foreign Application Priority Data

Nov. 5, 2015 (JP) ................................. 2015-217459
Aug. 8, 2016 (JP) ................................. 2016-155853

(51) Int. Cl.
*H01R 12/57* (2011.01)
*B60J 1/00* (2006.01)
(Continued)

(52) U.S. Cl.
CPC ................ *H01R 12/57* (2013.01); *B60J 1/00* (2013.01); *H01R 12/515* (2013.01);
(Continued)

(58) Field of Classification Search
CPC .............................. H01R 12/57; H01R 9/096
See application file for complete search history.

(56) References Cited

U.S. PATENT DOCUMENTS 4,658,331 A * 4/1987 Berg .................... H05K 7/1061
361/705
6,544,047 B2 * 4/2003 Moore ..................... H01R 4/64
174/376
(Continued)

FOREIGN PATENT DOCUMENTS

EP 0542473 A1 5/1993
JP UM-H05-043608 A 6/1993
(Continued)

OTHER PUBLICATIONS

International Search Report (with English Translation) and Written Opinion (in Japanese only) for PCT/JP2016/082864 dated Dec. 27, 2016.

*Primary Examiner* — Tho D Ta
(74) *Attorney, Agent, or Firm* — Foley & Lardner LLP

(57) ABSTRACT

An electric connection structure (1) is provided with: a glass plate (10); a power supply part (15) formed in the glass plate (10); a terminal (20) having a base part (21) opposing the glass plate (10); and a spring member (35) formed from a conductor and disposed between the power supply part (15) and the base part (21). The power supply part (15) and the base part (21) make contact with the spring member (35), whereby the power supply part (15) and the base part (21) are electrically connected via the spring member (35).

18 Claims, 15 Drawing Sheets

(51) Int. Cl.
*H01R 13/04* (2006.01)
*H01R 13/15* (2006.01)
*H01R 43/00* (2006.01)
*H01R 12/51* (2011.01)
*H01R 12/70* (2011.01)
*H01R 12/71* (2011.01)
*H01R 43/18* (2006.01)
*H01R 43/20* (2006.01)
*H01R 12/00* (2006.01)
*C03C 17/04* (2006.01)

(52) U.S. Cl.
CPC ..... *H01R 12/7041* (2013.01); *H01R 12/7088* (2013.01); *H01R 12/718* (2013.01); *H01R 13/04* (2013.01); *H01R 13/15* (2013.01); *H01R 43/00* (2013.01); *H01R 43/18* (2013.01); *H01R 43/205* (2013.01); *C03C 17/04* (2013.01); *H01R 9/096* (2013.01)

(56) References Cited

U.S. PATENT DOCUMENTS

| | | | |
|---|---|---|---|
| 7,059,884 | B2 | 6/2006 | Hisaeda et al. |
| 8,926,338 | B2 | 1/2015 | Kiryu et al. |
| 9,520,665 | B2 | 12/2016 | Takeuchi et al. |
| 2005/0221657 | A1 | 10/2005 | Hisaeda et al. |
| 2011/0163569 | A1* | 7/2011 | Yoneyama ........... H01R 12/515 296/146.1 |
| 2014/0087605 | A1 | 3/2014 | Kiryu et al. |
| 2015/0155646 | A1 | 6/2015 | Takeuchi et al. |

FOREIGN PATENT DOCUMENTS

| | | |
|---|---|---|
| JP | 2014-071964 A | 4/2014 |
| JP | 2014-072101 A | 4/2014 |
| WO | WO-2004/049511 A1 | 6/2004 |
| WO | WO-2014/024980 A1 | 2/2014 |

\* cited by examiner

ELECTRIC CONNECTION STRUCTURE, GLASS PLATE WITH TERMINAL, AND METHOD FOR MANUFACTURING GLASS PLATE WITH TERMINAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/082864, filed on Nov. 4, 2016, which is based upon and claims the benefit of priority of Japanese Patent Application No. 2015-217459, filed on Nov. 5, 2015, and Japanese Patent Application No. 2016-155853, filed on Aug. 8, 2016, the entireties of which are hereby incorporated by reference.

TECHNICAL FIELD

The present invention relates to an electric connection structure, a glass plate with terminal, and a method for manufacturing a glass plate with terminal.

BACKGROUND ART

Lead-containing solder is used for joining of a terminal and a conductor (power supply member) that is formed on the surface of a glass plate in uses involving the windshield of an automobile. In recent years, lead-free solder has come to be desired for the purposes of, among other things, reduction of the load on the environment.

However, lead-free solder has not been employed broadly because it uses, as materials to replace lead, indium, tin, silver, etc. which are expensive. On the other hand, there is a proposal that instead of lead-free solder, conductive rubber, for example, be used as a means for joining a conductor and a terminal (see, e.g., Patent document 1, for example). Conductive rubber establishes an electric connection between a conductor and a terminal in such a manner that it is kept in a compressed state.

BACKGROUND ART DOCUMENTS

Patent Documents

Patent document 1: WO 2014/024980

SUMMARY OF THE INVENTION

Problem that the Invention is to Solve

Conductive rubber has a problem that it degrades and increases in electric resistance when it is used for a long time. There is no problem to use conductive rubber having a relatively large electric resistance when a current flowing through it is relatively small such as use for an antenna or the like. However, in uses in which a relatively large current flows as in, for example, glass plate anti-fogging, using conductive rubber would cause problems because of a large power loss.

The present invention has been made in view of the above problems, and an object of the invention is therefore to provide an electric connection structure in which increase in electric resistance is prevented even after long-time use, as well as a glass plate with terminal having such an electric connection structure, and a method for manufacturing such a glass plate with terminal.

Means for Solving the Problem

One embodiment of the electric connection structure of the present invention includes:
a glass plate;
a power supply member formed on the glass plate;
a terminal having a base portion which is opposed to the glass plate; and
a spring member which is made of a conductor and disposed between the power supply member and the base portion, in which the power supply member and the base portion contact with the spring member, thereby establishing electric continuity between the power supply member and the base portion via the spring member.

In one embodiment of the electric connection structure of the present invention, the electric connection structure may further include an adhesive layer which bonds at least one of the glass plate and the power supply member to the base portion.

In one embodiment of the electric connection structure of the present invention, the spring member is formed into a plate-like shape extending in a first direction, and a central portion in the first direction of the spring member is curved so as to be convex in a thickness direction of the glass plate so that the spring member has a curved portion; and a central portion of the curved portion is in contact with one of the power supply member and the base portion; and two end portions of the curved portion in the first direction are in contact with the other of the power supply member and the base portion.

In one embodiment of the electric connection structure of the present invention, the central portion of the curved portion is in contact with the power supply member; and the two end portions of the curved portion in the first direction are in contact with the base portion.

In one embodiment of the electric connection structure of the present invention, the spring member has an escape portion which is formed with a concave portion; and the concave portion is concaved toward a side toward which the curved portion is curved so as to be convex, from a reference plane that includes surfaces of the two end portions of the curved portion.

In one embodiment of the electric connection structure of the present invention, the escape portion is formed into a plate-like shape extending in the first direction, and is curved in such a manner that a central portion of the escape portion in the first direction is convex toward the side toward which the curved portion is curved so as to be convex.

In one embodiment of the electric connection structure of the present invention, the spring member has a flat portion which is disposed at at least one end of the curved portion in the first direction and extends in the first direction.

In one embodiment of the electric connection structure of the present invention, the base portion is formed into a plate-like shape; and projection portions which project from a major surface of the base portion, are in contact with at least one of the glass plate and the power supply member, and prevent the spring member interposed between the power supply member and the base portion from deforming to a prescribed degree or more.

In one embodiment of the electric connection structure of the present invention, the adhesive layer is disposed so as to surround the spring member.

In one embodiment of the electric connection structure of the present invention, the base portion is formed into a plate-like shape; and a major surface of the base portion has a groove formed between a region where the spring member is disposed and a region where the adhesive layer is formed.

One embodiment of a glass plate with terminal, has the electric connection structure described above.

One embodiment of the present invention is a method for manufacturing a glass plate with terminal, the method includes a first step of disposing a spring member made of a conductor between a power supply member of a glass plate and a base portion of a terminal; and a second step of compressing the spring member in a thickness direction of the glass plate, in which the power supply member and the base portion contact with the spring member, thereby establishing electric continuity between the power supply member and the base portion via the spring member.

In one embodiment of the method for manufacturing a glass plate with terminal of the present invention, the first step forms a thermosetting adhesive layer between at least one of the glass plate and the power supply member and the base portion; and the second step forms an adhesive layer by heating and setting the thermosetting adhesive layer while the thermosetting adhesive layer is in a state of being compressed in the thickness direction.

In one embodiment of the method for manufacturing a glass plate with terminal of the present invention, the second step may include: a softening step of softening the thermosetting adhesive layer first by heating it; and a setting step of setting the thermosetting adhesive layer by heating it while it is in a compressed state.

In one embodiment of the method for manufacturing a glass plate with terminal of the present invention, the glass plate is a laminated glass formed by bonding plural glass single plates via an intermediate film or films; and the first step and the second step may be performed after a heat-bonding step of heating and bonding the plural glass single plates and the intermediate film or films together.

Advantage of the Invention

The electric connection structure, the glass plate with terminal, and the method for manufacturing a glass plate with terminal according to the invention make it possible to prevent increase in electric resistance during long-time use.

MODE FOR CARRYING OUT THE INVENTION

First Embodiment

A glass plate with terminal according to the first embodiment of the present invention will be hereinafter described with reference to FIGS. 1-17.

Figure 1:
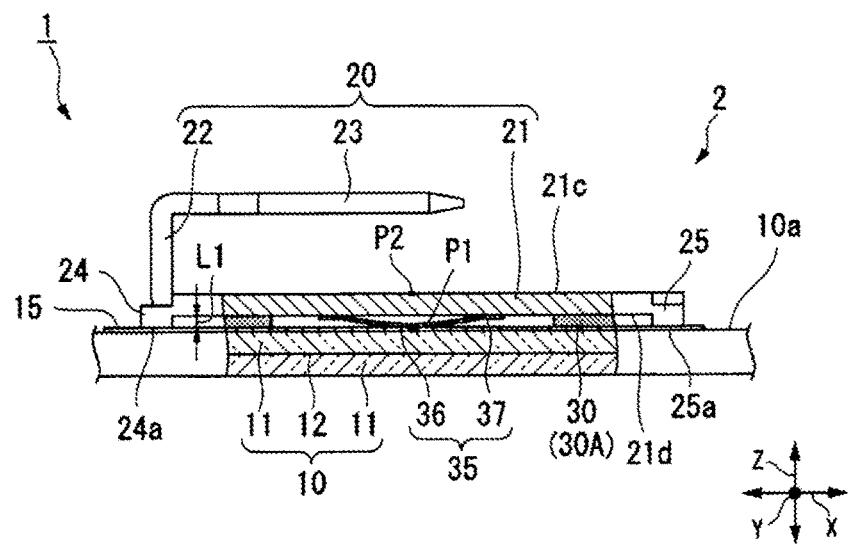
FIG. 1 is a side sectional view of a glass plate with terminal according to a first embodiment of the present invention.
Figure 2:
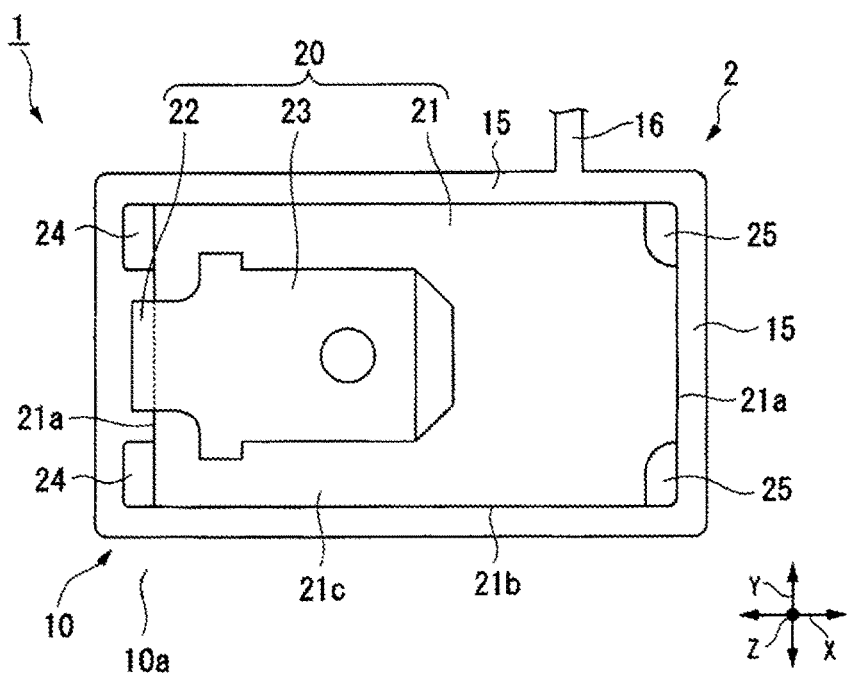
FIG. 2 is a plan view of the same glass plate with terminal.

FIG. 1 is a side sectional view of a glass plate with terminal 1 according to this embodiment, and FIG. 2 is a plan view of the glass plate with terminal 1.

As shown in FIGS. 1 and 2, the glass plate with terminal 1 according to the embodiment is equipped with a glass plate 10, a power supply member 15 formed on the glass plate 10, a terminal 20 having a base portion 21 which is opposed to the glass plate 10, an adhesive layer 30 which bonds the power supply member 15 and the base portion 21, and a spring member 35 disposed between the power supply member 15 and the base portion 21.

The glass plate 10, the power supply member 15, the terminal 20, the adhesive layer 30, and the spring member 35 constitute an electric connection structure 2 according to the embodiment.

<Glass Plate>

The glass plate 10 is a glass laminate having a known structure that is formed by bonding plural (in the embodiment, two) glass single plates 11 via an intermediate film 12.

For example, the power supply member 15 is formed on a major surface 10a of the glass plate 10 in a rectangular shape. The term "major surface" as used herein means an outer surface, approximately perpendicular to its thickness direction, of a plate-like member. The power supply member 15 is formed so as to have a wider area than the base portion 21 in a plan view.

A linear conductor 16 is connected to the power supply member 15. The power supply member 15 and the linear conductor 16 are formed by printing a paste containing a conductive metal such as silver paste on the major surface 10a of the glass plate 10 and welding it.

However, the method for forming the power supply member 15 and the linear conductor 16 is not limited to the above method. For example, the power supply member 15 and the linear conductor 16 may be formed by sticking a linear or foil-like body made of a conductive material such as copper to the major surface 10a of the glass plate 10 with an adhesive or the like.

For example, the linear conductor 16 is an antenna element or a line for supplying power to an antenna element. The linear conductor 16 may be a heater line for preventing fogging of the glass plate 10. The power supply member 15 may serve for supply of power to a conductive film that is formed on the glass plate 10; the power supply member 15 may be a member for supplying power to any conductor formed on the glass plate 10.

The term "supply of power" may mean either of supplying power to the linear conductor, for example, or receiving power from the linear conductor.

<Terminal>

The terminal 20 has the above-mentioned base portion 21 which is formed into a plate-like shape and is rectangular in a plan view, a support portion 22 which is erected from one end portion, in the longitudinal direction (first direction) X, of the base portion 21, a male terminal portion 23 which extends from the tip of the erected support portion 22, and stoppers (projection portions) 24 and 25 which are provided at two end portions of the base portion 21 in the longitudinal direction X.

Second sides 21b of the base portion 21 which extend in the longitudinal direction X and adjoin its first sides 21a are longer than the first sides 21a which extend in the width direction Y.

The support portion 22 is erected from a central portion, in the thickness direction Z of the glass plate 10, of one first side 21a. The length of the support portion 22 in the width direction Y is shorter than that of the base portion 21 in the width direction Y. The width direction Y is the direction that is perpendicular to each of the longitudinal direction X and the thickness direction Z. The support portion 22 holds the male terminal portion 23 so that the base portion 21 and the male terminal portion 23 are spaced from each other by a prescribed distance.

The male terminal portion 23 extends from the tip of the support portion 22 toward the other end portion in the longitudinal direction X parallel to the first major surface 21c of the base portion 21. The male terminal portion 23 is a flat tab terminal to which an electric wire is to be connected. For example, the male terminal portion 23 is one that is formed according to PA or PB of JIS (Japanese Industrial Standards) D5403 (1989).

The above-mentioned stoppers 24 are provided at the two respective ends of the first side 21a, located at the one end in the longitudinal direction X, of the base portion 21. The stoppers 24 project from the ends of the first side 21a in the longitudinal direction X. The stoppers 24 are stepped so as to project from the base portion 21 in the thickness direction Z and to go away from the male terminal portion 23 (i.e., to come closer to the glass plate 10). Bottom surfaces 24a of the stoppers 24 are flat surfaces that are parallel to a second major surface (major surface) 21d of the base portion 21. The second major surface 21d is a surface that is located on the opposite side to the first major surface 21c.

It is preferable that the distance L1 between the second major surface 21d of the base portion 21 and the bottom surfaces 24a of the stoppers 24 be in a range of 0.2 to 0.6 mm to assure that the spring member 35 is in contact with the second major surface 21d and the power supply member 15 stably.

The above-mentioned stoppers 25 are provided at the two respective ends of the first side 21a, located at the other end in the longitudinal direction X, of the base portion 21. The stoppers 25 are stepped so as to project from corner portions of the base portion 21 in the thickness direction Z and to go away from the male terminal portion 23. Bottom surfaces 25a of the stoppers 25 are flat surfaces that are flush with the bottom surfaces 24a of the stoppers 24. The stoppers 24 and 25 project from the second major surface 21d of the base portion 21. The bottom surfaces 24a and 25a of the stoppers 24 and 25 are in contact with or very close to the power supply member 15. The term "very close" as used herein means that the distances between the bottom surfaces 24a and 25a and the power supply member 15 is longer than 0 mm and shorter than or equal to 0.2 mm.

The base portion 21, the support portion 22, the male terminal portion 23, and the stoppers 24 and 25 are unitized portions formed by, for example, punching or pressing a thin plate made of copper or the like and plating a resulting plate with tin or nickel.

<Adhesive Layer>

Figure 3:
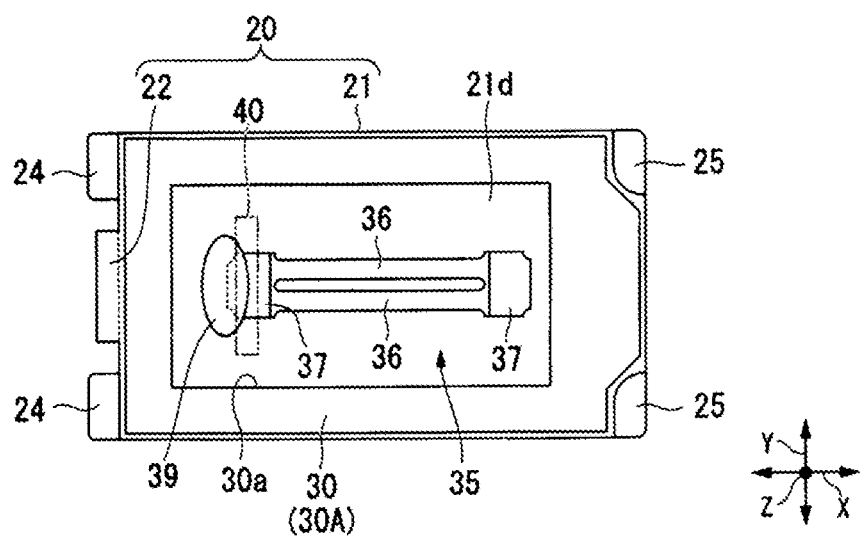
FIG. 3 is a bottom view of a terminal of the same glass plate with terminal.

FIG. 3 is a bottom view of the terminal 20.

As shown in FIGS. 1 and 3, in a plan view, the adhesive layer 30 is formed into a frame-like shape having a rectangular outline. The outer circumference of the adhesive layer 30 is parallel to that of the second major surface 21d of the base portion 21. The adhesive layer 30 is disposed so as to surround the spring member 35. The adhesive layer 30 exerts a force that serves to decrease the distance between the power supply member 15 and the terminal 20.

It is preferable that the adhesive layer 30 be one that is formed by heating a thermosetting adhesive layer 30A formed by shaping unset thermosetting adhesive into approximately the same shape as the shape of the adhesive layer 30 and thereby causing it to set. The thermosetting adhesive is softened first when heated and sets if it continues to be heated after the softening. It is preferable that the adhesive layer 30 have a characteristic that when heated from before bonding of the power supply member 15 and the base portion 21, its viscosity becomes lower than or equal to $6.0 \times 10^3$ Pa·s at a temperature that is higher than or equal to 70° C. and lower than 120° C. and it sets at a temperature that is higher than or equal to 120° C. It is preferable that the viscosity of the thermosetting adhesive become lower than or equal to $6.0 \times 10^3$ Pa·s at a temperature that is higher than or equal to 80° C. and lower than 110° C. It is even preferable that the viscosity of the thermosetting adhesive become lower than or equal to $5.0 \times 10^3$ Pa·s at a temperature that is higher than or equal to 70° C. and lower than 120° C. The setting temperature of the thermosetting adhesive may be higher than or equal to 130° C.

Figure 4:
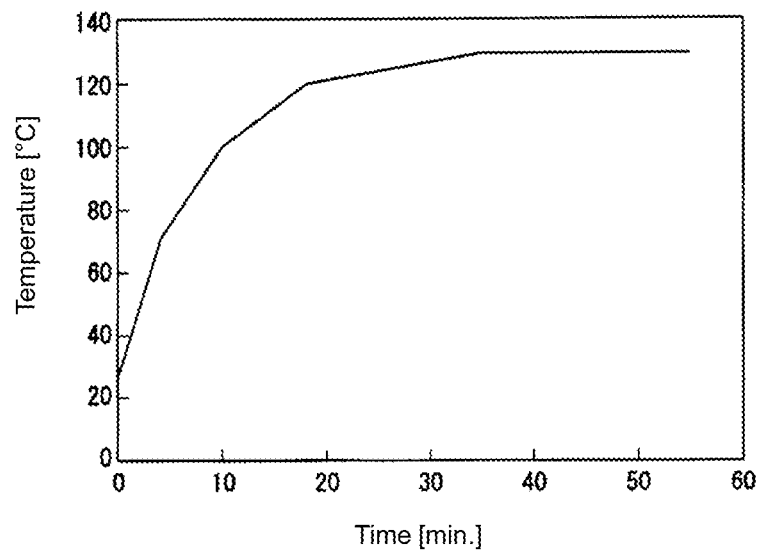
FIG. 4 is a graph showing a heating temperature-time profile for a thermosetting adhesive.
Figure 5:
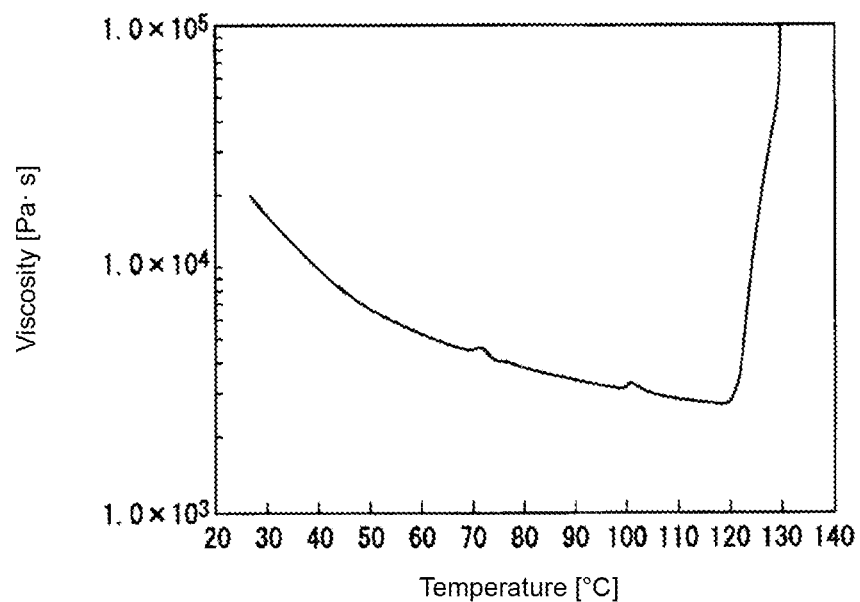
FIG. 5 is a graph showing how the viscosity of the thermosetting adhesive varies with the heating temperature.
Figure 6:
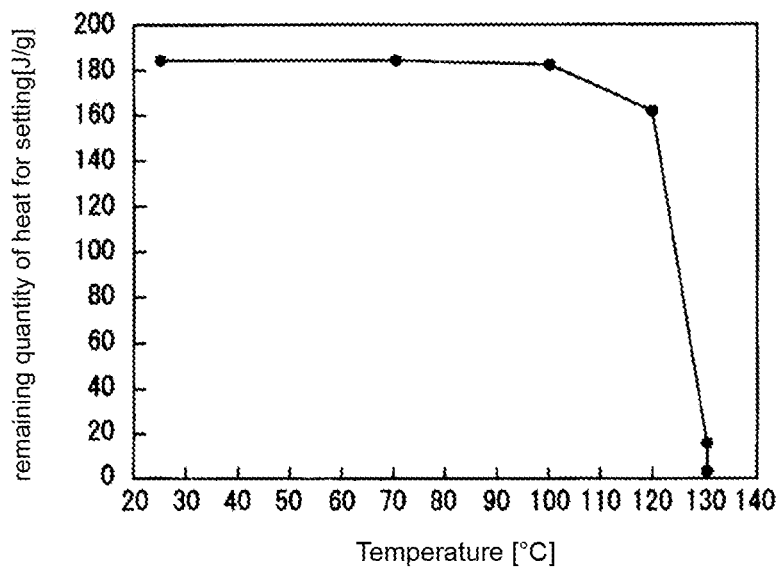
FIG. 6 is a graph showing how the remaining quantity of heat for setting of the thermosetting adhesive varies with respect to the heating temperature.

More specifically, the viscosity of the thermosetting adhesive varies as shown in FIG. 5 when it is heated according to a temperature-time profile shown in FIG. 4. The thermosetting adhesive softens as its temperature increases from normal temperature due to heating, and sets after its temperature exceeds a prescribed temperature. FIG. 6 shows a result of a measurement of the remaining quantity of heat for setting by differential scanning calorimetry (DSC). The thermosetting adhesive has a property that it sets quickly when its temperature exceeds a prescribed temperature (in FIG. 6, 120° C.).

When the thermosetting adhesive layer 30A is softened first by heating, the power supply member 15 and the base portion 21 come into close contact with each other via the thermosetting adhesive layer 30A. The thickness of the thermosetting adhesive layer 30A can easily be made smaller than before the bonding by further pressing the thermosetting adhesive layer 30A. The thermosetting adhesive layer 30A turns to an adhesive layer 30 when set by heating it further. In this manner, the adhesive layer 30 can be set in a state that it is compressed in the thickness direction Z.

In the embodiment, the adhesive layer 30 bonds the power supply member 15 to the base portion 21. However, where, for example, the power supply member 15 is formed on the major surface 10a of the glass plate 10 in a small area, the adhesive layer 30 may bond the glass plate 10 to the base portion 21 or bond the glass plate 10 and the power supply member 15 to the base portion 21.

<Spring Member>

Figure 7:
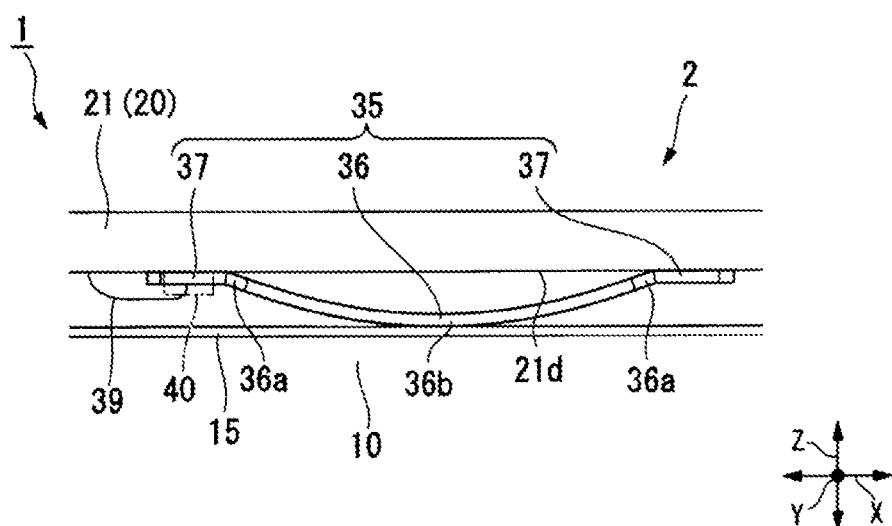
FIG. 7 is a side view showing how a spring member is attached to a base portion of the same terminal.

FIG. 7 is a side view showing how the spring member 35 is attached to the base portion 21. As shown in FIGS. 3 and 7, the spring member 35, which is so called a bridge contact, has two curved portions 36 which are shaped like plates extending in the longitudinal direction X and are curved so as to be convex downward in the thickness direction Z and flat portions 37 which extend in the longitudinal direction X from two respective sets of end portions 36a, in the longitudinal direction X, of the curved portions 36.

A central portion 36b, in the longitudinal direction X, of each curved portion 36 is curved so as to be convex downward in the thickness direction Z, in other words, toward the power supply member 15. The two curved portions 36 are arranged side by side so as to be spaced from each other in the width direction Y. End portions, in the longitudinal direction X, of the flat portions 37 are continuous with the end portions, in the longitudinal direction X, of the curved portions 36. Each flat portion 37 connects the two curved portions 36.

The curved portions 36 and the flat portions 37 which constitute the spring member 35 are unitized portions formed by, for example, punching or pressing a plate material made of a metal such as a beryllium copper alloy. It is preferable that the spring member 35 be one subjected to gold plating, silver plating, or the like.

Instead of a bridge contact, what is called a torsion contact or a chip contact can be used as the spring member 35. Although it was stated above that the spring member 35 is made of a metal, it suffices that the spring member 35 be made of a conductor (electric conductor). Example conductors include, in addition to a metal, a conductive polymer, a conductor, an insulator, or the like whose surfaces are, for example, plated with a conductive substance.

The spring member 35 is disposed in a hollow space 30a of the adhesive layer 30.

The spring member 35 is attached (tentatively fixed) to the second major surface 21d of the base portion 21 by an auxiliary bonding portion 39 which connects one of the flat portions 37 to the base portion 21. By bringing the flat portions 37 into contact with the second major surface 21d, the spring member 35 is made less likely to wobble with respect to the second major surface 21d.

It is preferable that the auxiliary bonding portion 39 be made of an ultraviolet-curing adhesive that is relatively high in viscosity. This is because the ultraviolet-curing adhesive that is relatively high in viscosity less likely expands between the base portion 21 and the flat portion 37.

Instead of using the auxiliary bonding portion 39, one of the flat portions 37 may be fixed tentatively to the base portion 21 with a tape 40.

The curved portions 36 of the spring member 35 are interposed between the power supply member 15 and the base portion 21 and compressed in the thickness direction Z by the power supply member 15 and the base portion 21. The spring member 35 exerts a force of increasing the distance between the power supply member 15 and the terminal 20.

The two end portions 36a of each curved portion 36 and the flat portions 37 of the spring member 35 are in contact with the second major surface 21d of the base portion 21 and the central portions 36b of the curved portions 36 are in contact with the power supply member 15. That is, each curved portion 36 is in contact with the base portion 21 at two points and with the power supply member 15 at one point. Since the power supply member 15 and the base portion 21 are in contact with the spring member 35, electric continuity is established between the power supply member 15 and the base portion 21 via the spring member 35. Bringing the flat portions 37 into contact with the base portion 21 makes it easier to fix the spring member 35 to the base portion 21 tentatively.

As shown in FIG. 1, a gap having a prescribed height is formed between the second major surface 21d of the base portion 21 and the power supply member 15 as a result of the fact that the bottom surfaces 24a and 25a of the stoppers 24 and 25 are in contact with the power supply member 15. This gap prevents the curved portions 36 of the spring member 35 from being deformed to a prescribed degree or more. It is preferable that the prescribed degree corresponds to, for example, the 0.2% proof stress (indicating the limit of elastic deformation) of the material of the spring member 35.

A description will be made of an example case that a current flows from the power supply member 15 to the base portion 21 via the spring member 35 in the glass plate with terminal 1 that is configured and manufactured in the above-described manner. A current that has flown into the power supply member 15 branches off at the central portions 36b of the curved portions 36 of the spring member 35 into two currents that flow toward the two pairs of end portions 36a. This allows a relatively large current to flow through the spring member 35.

There may occur an event that the one of the two pairs of end portions 36a and the base portion 21 are electrically insulated from each other because, for example, part of the auxiliary bonding portion 39 goes into between the one pair of end portions 36a and the base portion 21. Even if such an electrical insulation event occurs, a current can still flow from the power supply member 15 to the base portion 21 via the spring member 35 as long as the other pair of end portions 36a and the base portion 21 are electrically connected to each other.

Results of various tests that were conducted using the glass plate with terminal 1 having the above configuration will be described below. Relative small test pieces of the glass plate 10 were used. The spring member 35 that was used in the tests described below had the two curved portions 36 as shown in FIG. 3. A busbar (not shown) that was a band-shaped metal film was used as the power supply member 15.

A thermosetting, semi-structural acrylic foam tape #9270 produced by 3M Japan Limited was used as the adhesive layer 30. A bridge contact GCB4 produced by Globtec (Japan) Limited was used as the spring member 35.

Figure 8:
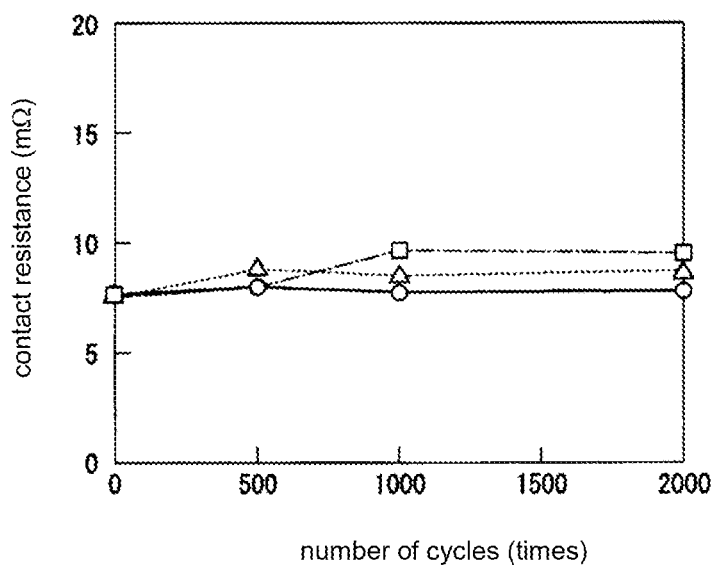
FIG. 8 shows a result of a heat shock test that was conducted on the same glass plate with terminal.

FIG. 8 shows a result of a heat shock test that was conducted on the glass plate with terminal 1. The heat shock test was conducted on the glass plate with terminal 1 that was set in a test tank in such a manner that a cycle consisting of a state that the glass plate with terminal 1 was held at an outside air temperature 80° C. for 30 min and a state that it was held at an outside air temperature −30° C. for 30 min was repeated 1,000 times. A state obtained by 1,000 times of repetition of the cycle corresponds to, for example, a state that the glass plate with terminal 1 has been used for 5 to 10 years in an automobile.

Since the heat shock test is a test relating to an item that may suffer performance degradation due to temperature variations at a relatively high probability, the cycle was repeated up to 2,000 times. The contact resistance of the glass plate with terminal 1 should be an electric resistance between point P1 of the power supply member 15 and point P2 of the base portion 21 (see FIG. 1). However, the contact resistance described below includes the electric resistance of the busbar that was used as the power supply member 15.

In FIG. 8, the horizontal axis represents the number of cycles and the vertical axis represents the contact resistance (mΩ).

Marks "○," "Δ," and "□" correspond to different samples. That is, three samples of the glass plate with terminal 1 having the same configuration were subjected to the heat shock test. Almost no change was found in the contact resistance of the glass plate with terminal 1 from 7 to 10 mΩ even after 2,000 times of repetition of the temperature variation cycle.

Figure 9:
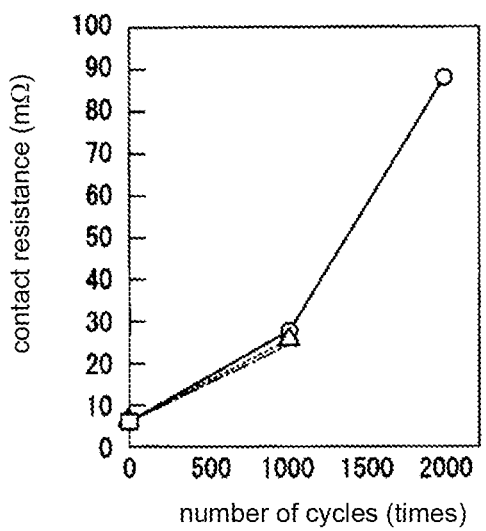
FIG. 9 shows a result of a heat shock test that was conducted on a conventional glass plate with terminal.

FIG. 9 is a graph showing a result of a heat shock test that was conducted on a conventional glass plate with terminal (Comparative example) described in Patent document 1. The glass plate with terminal of Comparative example is equipped with a conductive rubber member instead of the spring member 35 of the glass plate with terminal 1 according to the embodiment. Three samples were subjected to the heat shock test.

The contact resistance was about 6 to 7 mΩ at the start of the test. But the contact resistance became about 30 mΩ after 1,000 times of repetition of the cycle and about 90 mΩ after 2,000 times of repetition of the cycle.

Figure 10:
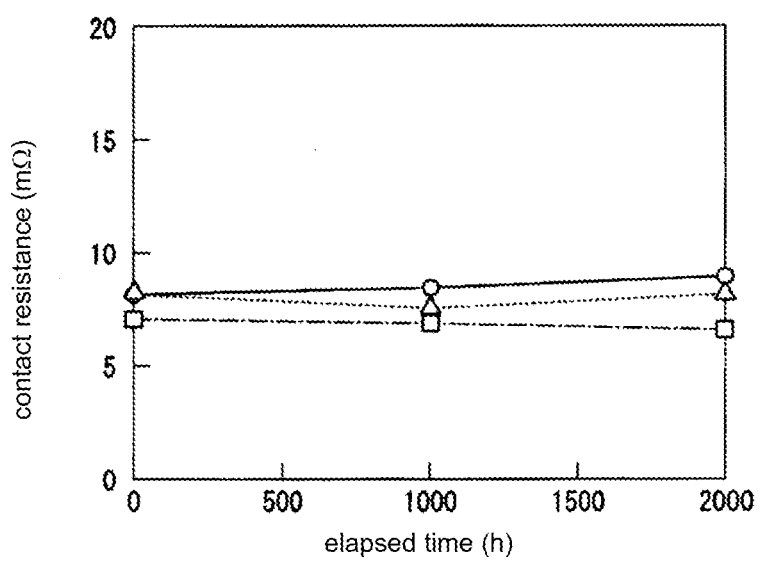
FIG. 10 shows a result of a high-temperature shelf test on the glass plate with terminal according to the first embodiment.

FIG. 10 shows a result of a high-temperature shelf test that was conducted on the glass plate with terminal 1. The high-temperature shelf test is a test that the glass plate with terminal 1 is left as it is at an outside air temperature 105° C. for 1,000 hours. Since the high-temperature shelf test is a test relating to an item that may suffer performance degradation due to heat at a relatively high probability, the glass plate with terminal 1 was left as it was for up to 2,000 hours. In FIG. 10, the horizontal axis represents the elapsed time (h) and the vertical axis represents the contact resistance (mΩ).

Almost no change was found in the contact resistance of the glass plate with terminal 1 from 6 to 9 mΩ even after it was left as it was for each of 1,000 hours and 2,000 hours.

Figure 11:
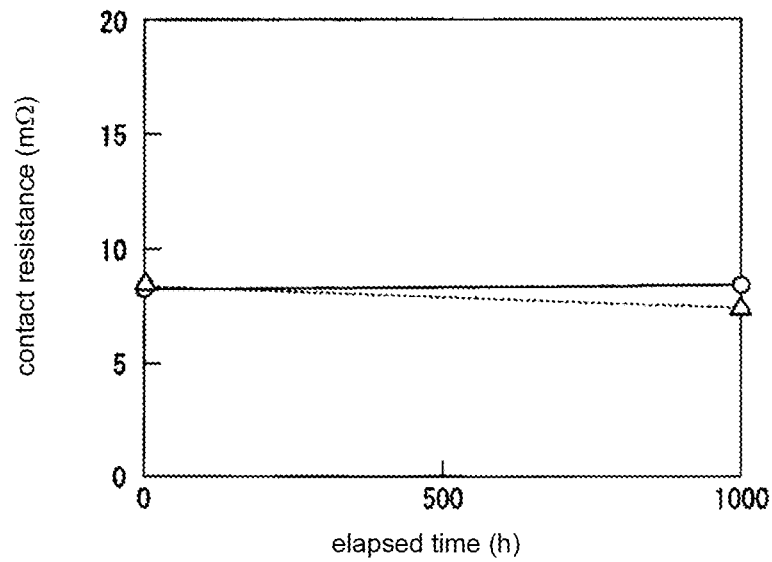
FIG. 11 shows a result of a low-temperature shelf test on the same glass plate with terminal.

FIG. 11 shows a result of a low-temperature shelf test that was conducted on the glass plate with terminal 1. The low-temperature shelf test is a test that the glass plate with terminal 1 is left as it is at an outside air temperature −40° C. for 1,000 hours. Marks "○" and "Δ" correspond to different samples. That is, two samples were subjected to the low-temperature shelf test.

Almost no change was found in the contact resistance of the glass plate with terminal 1 from 7 to 9 mΩ even after it was left as it was for 1,000 hours.

Figure 12:
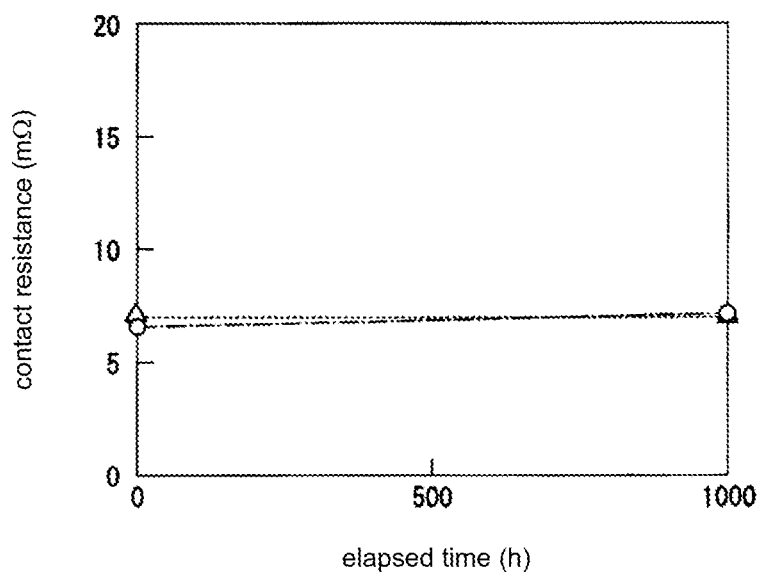
FIG. 12 shows a result of a high-temperature/high-humidity test on the same glass plate with terminal.

FIG. 12 shows a result of a high-temperature/high-humidity test that was conducted on the glass plate with terminal 1. The high-temperature/high-humidity test is a test that the glass plate with terminal 1 is left as it is at an outside air temperature 80° C. and a humidity 85% for 1,000 hours.

Almost no change was found in the contact resistance of the glass plate with terminal 1 from 6 to 7 mΩ even after it was left as it was for 1,000 hours.

Figure 13:
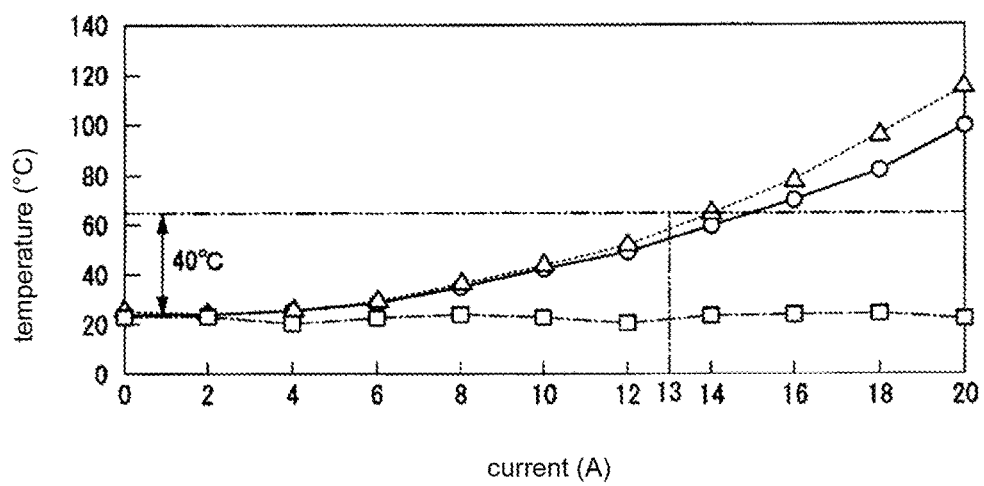
FIG. 13 shows a result of a conduction characteristic test on the same glass plate with terminal.

FIG. 13 shows a result of a conduction characteristic test that was conducted on the glass plate with terminal 1. The conduction characteristic test is a test for determining a temperature at which the temperature of the spring member 35 stabilizes that heats when a prescribed current flows through it. In FIG. 13, the horizontal axis represents the current (A) and the vertical axis represents the temperature (° C.).

Marks "○" and "Δ" correspond to different samples. That is, two samples were subjected to the conduction characteristic test. Marks "□" indicate outside air temperature values.

In general, it would be preferable that the difference between the temperature of the spring member 35 determined by the conduction characteristic test and the outside air temperature be smaller than 40° C. It was found that a relatively large current, a maximum of about 13 A, can flow through the spring member 35.

It was found that since the spring member 35 is made of a metal, increase of its contact resistance can be prevented in the heat shock test and the high-temperature shelf test which are conducted at relatively high temperatures and also in the other tests, that is, the low-temperature shelf test and the high-temperature/high-humidity test.

<Method for Manufacturing Glass Plate with Terminal>

Figure 14:
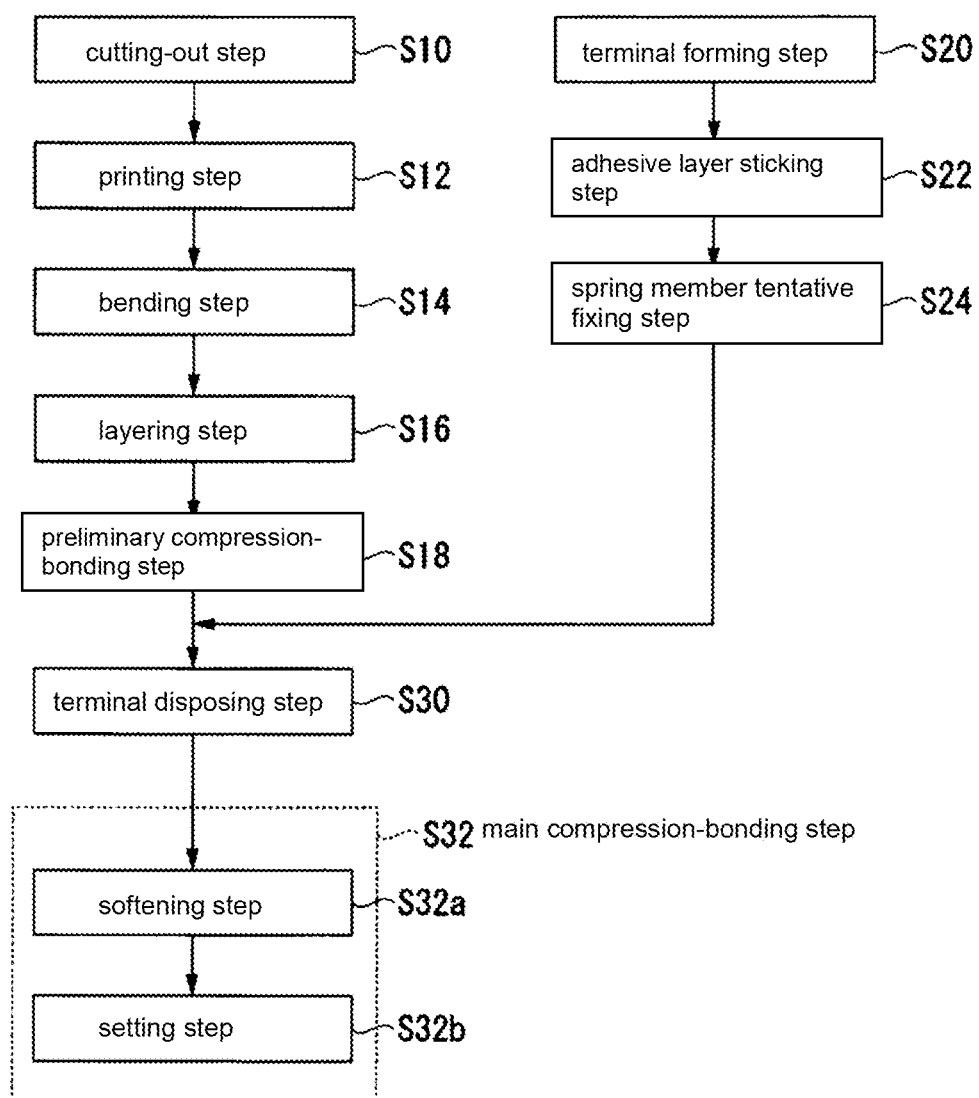
FIG. 14 is a flowchart of a method for manufacturing the glass plate with terminal according to the first embodiment of the invention.

Next, a method for manufacturing the glass plate with terminal 1 having the above-described configuration (hereinafter may be abbreviated as a "manufacturing method") will be described. A method for manufacturing the glass plate with terminal 1 will be described below in a case that it is used for the windshield of a vehicle. FIG. 14 is a flowchart of the manufacturing method.

A cutting-out step (step S10) is a step of cutting out, from a glass original plate, glass single plates 11 to be used for forming a laminated glass. There are no limitations on the method for cutting the glass original plate; for example, glass single plates 11 are cut out by forming scribe lines in a window glass shape on a rectangular glass original plate with a cutter and breaking the glass original plate. The circumferential edges of each cut-out glass single plate 11 are chamfered. A compartment-side glass single plate 11 and an outside glass single plate 11 are cut out in the cutting-out step.

In a printing step (step S12), silver paste to become a power supply member 15 (to be formed on the compartment-side surface of the compartment-side glass single plate 11) is printed. A linear conductor 16 may also be printed at the same time as the power supply member 15, and dark-color ceramic paste to become a shield layer (to be formed in a peripheral region of the glass single plate 11) may be formed before the printing of the power supply member 15.

A bending step (step S14) is a step of bending the two glass single plates 11 that have been subjected to the printing step S12 by such a method as gravity bending in a state that they are laid on each other with a die release agent interposed between them. In the bending step S14, the two glass single plates 11 are bent in a state that they are heated in a furnace and thereby softened. The two glass single plates 11 are cooled gradually after being bent into a prescribed shape. The bending method employed in the bending step S14 is not limited to gravity bending; the two glass single plates 11 may be shaped by press bending. The two glass single plates 11 may be bent one by one without being laid on each other.

A layering step (step S16) is a step of layering an intermediate film 12 between the two glass single plates 11 thus bent. The intermediate film 12 is made of polyvinyl butyral, for example.

A preliminary compression-bonding step (heating bonding step; step S18) is a step of bonding the intermediate film 12 to the two glass single plates 11 by heating them with air removal processing of removing air from between the intermediate film 12 and each of the two glass single plates 11. For example, air can be removed by heating, under a low pressure, a layered body consisting of the two glass single plates 11 and the intermediate film 12 laid between them. Alternatively, the preliminary compression-bonding step S18 may be executed by a nipper roll method or a rubber channel method.

A terminal forming step (step S20) is a step of forming a terminal 20 by, for example, punching or pressing a metal plate material.

An adhesive layer sticking step (step S22) is a step of sticking a thermosetting adhesive layer 30A to the second major surface 21d of the base portion 21 of the terminal 20 alongside its edges. The thermosetting adhesive layer 30A can be formed by punching a sheet-shaped thermosetting adhesive using a blade having a prescribed shape.

A spring member tentative fixing step (step S24) is a step of disposing a spring member 35 on the second major surface 21d of the base portion 21 in the hollow space of the thermosetting adhesive layer 30A. A worker disposes the spring member 35 on the second major surface 21d of the base portion 21 so that the curved portions 36 extend in the longitudinal direction X. The worker disposes the spring member 35 so that the curved portions 36 are convex toward the side opposite to the second major surface 21d of the base portion 21 in the thickness direction Z. It is preferable that at this time the bottoms of the thermosetting adhesive layer 30A and the spring member 35 be more distant from the second major surface 21d of the base portion 21 than the stoppers 24 and 25 are.

In a state that the flat portions 37 of the spring member 35 are in contact with the second major surface 21d of the base portion 21, an ultraviolet-curing adhesive is applied to the base portion 21 and one flat portion 37 and is irradiated with ultraviolet light, whereby the ultraviolet-curing adhesive is cured and becomes an auxiliary bonding portion 39. Although the ultraviolet-curing adhesive has an advantage of saving the working time, the adhesive is not limited to it and any of other kinds of adhesives may be used.

Instead of forming the auxiliary bonding portion 39, one flat portion 37 may be fixed tentatively to the base portion 21 with a tape 40.

A terminal disposing step (first step; step S30) is a step of disposing the terminal 20 on the power supply member 15 which is formed on the one of the two glass single plates 11 (e.g., compartment-side glass single plate 11).

As shown in FIG. 1, the spring member 35 is disposed between the power supply member 15 formed on the glass plate 10 and the base portion 21 of the terminal 20. The thermosetting adhesive layer 30A is located between the power supply member 15 and the base portion 21 so as to surround the spring member 35. At the end of the terminal disposing step S30, the hollow space of the thermosetting adhesive layer 30A is sealed from the outside of a glass plate with terminal 1. For example, the pressure of the air in the hollow space of the thermosetting adhesive layer 30A is equal to about 1 atm in terms of absolute pressure.

Although it was stated above that the spring member tentative fixing step S24 is executed after the adhesive layer sticking step S22, the adhesive layer sticking step S22 may be executed after the spring member tentative fixing step S24.

A main compression-bonding step (second step; step S32) is a heating bonding step of bonding the two glass single plates 11 and the intermediate film 12 together by heating them by processing the body consisting of the two glass single plates 11 and the intermediate film 12 laid between them at a high temperature under a high pressure in an autoclave. The terminal disposing step S30 and the main compression-bonding step S32 are executed after the preliminary compression-bonding step S18. Alternatively, the terminal disposing step S30 may be executed before the preliminary compression-bonding step S18.

Since the pressure in the autoclave is sufficiently higher than 1 atm and the hollow space of the thermosetting adhesive layer 30A is sealed up, the spring member 35 and the thermosetting adhesive layer 30A are compressed in the thickness direction Z.

More specifically, satisfaction of formula (1) is a condition (margin) of mounting of the base portion 21 on the glass plate 10.

{(Adhesion of thermosetting adhesive layer 30A)+ (compressive force due to high pressure in autoclave)}>(reaction force of deformed (compressed) spring member 35)  (1)

In the main compression-bonding step S32, the thermosetting adhesive layer 30A is set by heating it in a state that the spring member 35 and the thermosetting adhesive layer 30A are compressed in the thickness direction Z. Since the spring member 35 and the thermosetting adhesive layer 30A are compressed in the thickness direction Z, the power supply member 15 and the base portion 21 come into contact with the spring member 35 and are electrically connected to each other via the spring member 35.

In the main compression-bonding step S32, a softening step S32a of softening the thermosetting adhesive layer 30A first by heating it and a setting step S32b of setting the thermosetting adhesive layer 30A in a state that it is compressed are executed.

For example, compression bonding of the thermosetting adhesive layer 30A can be performed by setting it by pressing and heating it. Containing polymers that crosslink with each other when heated, the thermosetting adhesive layer 30A becomes an adhesive layer 30 when set. If the thermosetting adhesive layer 30A changes in color (e.g., changes from black (before setting) to gray (after setting) during the course of compression bonding, a compression-bonding state of the thermosetting adhesive layer 30A can be recognized visually using its color.

In the softening step S32a, when the thermosetting adhesive layer 30A softens first, the power supply member 15 and the terminal 20 are pressed against each other in the thickness direction Z and hence the bottom surfaces 24a and 25a of the stoppers 24 and 25 come into contact with or come very close to the power supply member 15. As a result, the distance between the power supply member 15 and the base portion 21 is maintained. The thermosetting adhesive layer 30A and the curved portions 36 of the spring member 35 are held being warped by prescribed amounts. The thermosetting adhesive layer 30A and the curved portions 36 come into close contact with the power supply member 15 and the base portion 21.

In the setting step S32b, the thermosetting adhesive layer 30A is set in the compressed state and becomes an adhesive layer 30.

The manufacturing method is not limited to the one consisting of the above-described steps, and may be one including a known step(s). For example, a cleaning step of cleaning the glass single plates may be executed as appropriate.

As described above, according to the electric connection structure 2, the glass plate with terminal 1, and its method for manufacturing the embodiment, since the spring member 35 is made of a metal, stable long-term durability is obtained and increase of the electric resistance can be prevented during long-time use.

Since the spring member 35 is shaped so as to have the curved portions 36, even if no current comes to flow to one of the two pairs of end portions 36a, a current can flow to the other of the two pairs of end portions 36a. Since a current branches off into two currents that flow through the curved portions 36, the spring member 35, even if it is small, allows a flow of a relatively large current.

Since the contact resistance is good even if the reaction force of the curved portions 36 is weak, the step of mounting the terminal 20 on the glass plate 10 is made simple.

The spring member 35 has the flat portions 37. When the flat portions 37 are in contact with the base portion 21, the spring member 35 is not likely to wobble with respect to the base portion 21, which facilitate the work of attaching the spring member 35 to the base portion 21 by the auxiliary bonding portion 39 or the like.

Since the spring member 35 is provided with the stoppers 24 and 25, the distance between the power supply member 15 and the base portion 21 is maintained by bringing the stoppers 24 and 25 into contact with the power supply member 15, whereby the thermosetting adhesive layer 30A and the spring member 35 can be prevented from being compressed excessively in the thickness direction Z.

Since the adhesive layer 30 is disposed so as to surround the spring member 35, no part of the high-pressure air in the autoclave goes into the hollow space of the thermosetting adhesive layer 30A when the glass plate with terminal 1 is put in the autoclave in the main compression-bonding step S32. Since no high-pressure air goes into the hollow space, the spring member 35 and the thermosetting adhesive layer 30A can be compressed easily in the thickness direction Z.

In this manufacturing method, the terminal disposing step S30 and the main compressing-bonding step S32 are executed. Since the thermosetting adhesive layer 30A that has softened once is then compressed and set, the thermosetting adhesive layer 30A can be brought into close contact with the power supply member 15 and the base portion 21.

Figure 15:
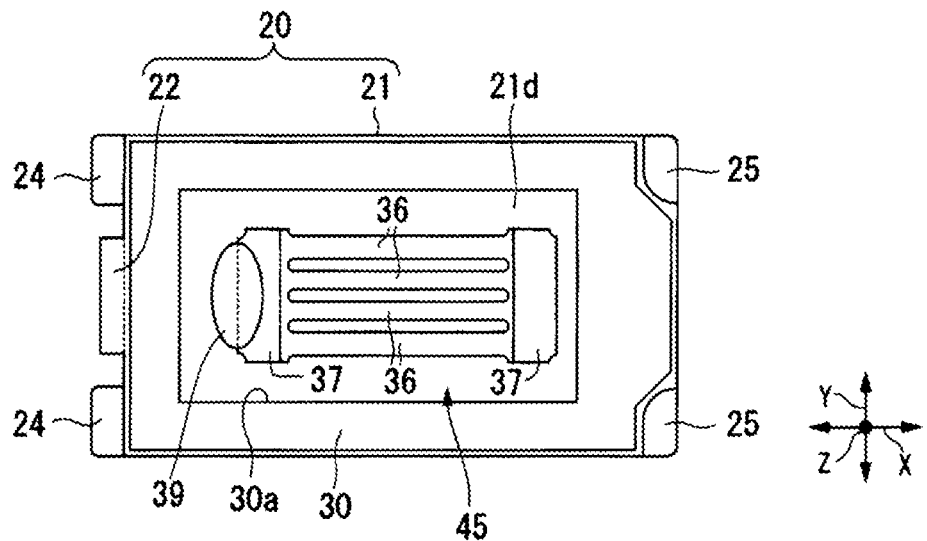
FIG. 15 is a bottom view of a terminal employed in a variation of the first embodiment of the invention.

FIG. 15 is a bottom view of a terminal 20 employed in a variation of the embodiment.

In this variation, a spring member 45 which is attached to the terminal 20 has four curved portions 36. As exemplified by this structure, there are no limitations on the number of curved portions 36 of the spring member. The current that can flow through the spring member becomes larger as the number of curved portions 36 of the spring member increases.

Figure 16:
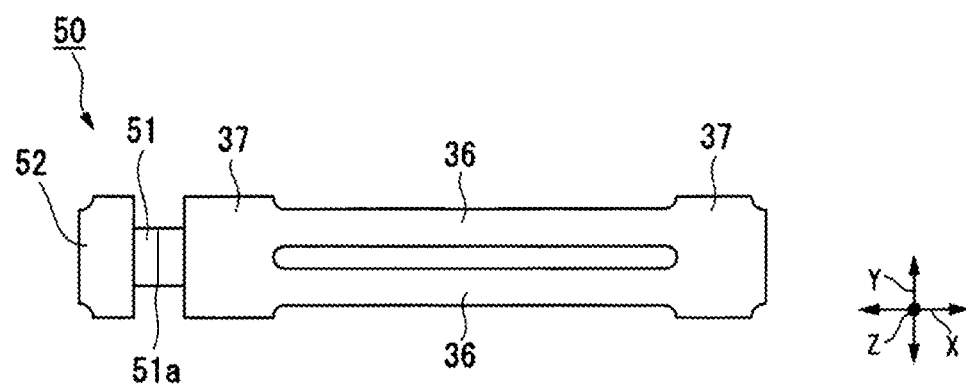
FIG. 16 is a bottom view of a spring member employed in another variation of the first embodiment of the invention.
Figure 17:
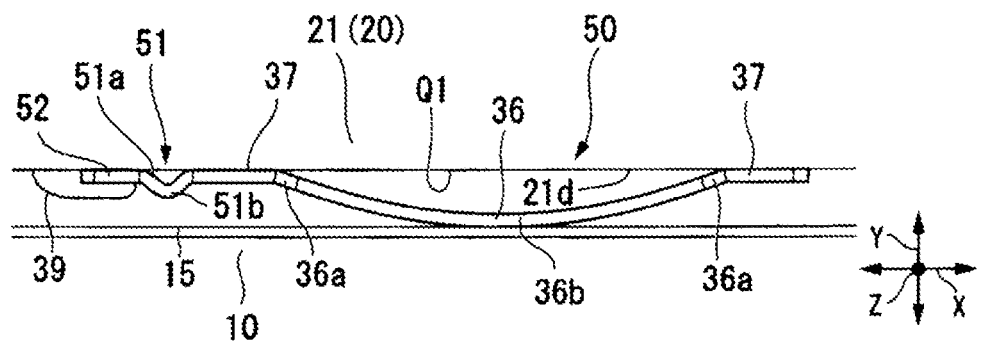
FIG. 17 is a side sectional view showing how the spring member is attached to the base portion of the terminal in the variation of the first embodiment of the invention.

FIG. 16 is a bottom view of a spring member 50 employed in another variation of the embodiment. FIG. 17 is a side sectional view showing how the spring member 50 is attached to the terminal 20.

The spring member 50 of the variation shown in FIGS. 16 and 17 has an escape portion 51 which is formed with a concave portion 51a and a second flat portion 52 which is continuous with the escape portion 51 in addition to the portions of the spring member 35 of the embodiment.

The escape portion 51 is shaped like a plate that extends in the longitudinal direction X. The escape portion 51 is curved in such a manner that its central portion 51b in the longitudinal direction X is convex toward the same side (glass plate 10 side) as the curved portions 36 are curbed so as to be convex toward. The concave portion 51a is a portion that is concaved as a result of the curving of the plate-like escape portion 51. The concave portion 51a is concaved toward the side toward which the curved portions 36 are convex, from a reference plane Q1 that includes the surfaces of the two pairs of end portions 36a of the curved portions 36. An end portion of the escape portion 51 is continuous with an end portion, opposite to the end portion that is continuous with the curved potions 36, of the flat portion 37.

The second flat portion 52 extends in the longitudinal direction X in the same plane as the flat portion 37 does. The second flat portion 52 is continuous with an end portion, opposite to the end portion that is continuous with the flat portion 37, of the escape portion 51.

The spring member 50 having the above structure is attached to the second major surface 21d of the base portion 21 by an auxiliary bonding portion 39 which connects the second flat portion 52 to the base portion 21. Even if part of the auxiliary bonding portion 39 goes into between the base portion 21 and the second flat portion 52, that part of the auxiliary bonding portion 39 does not expand much between the base portion 21 and the concave portion 51a of the escape portion 51 because the concave portion 51a is spaced from the base portion 21. Forming the escape portion 51 in the spring member 50 makes it possible to prevent part of the auxiliary bonding portion 39 from going into between the base portion 21 and the flat portion 37

Thus, even if part of the auxiliary bonding portion 39 goes into between the base portion 21 and the second flat portion 52, the base portion 21 and the flat portion 37 can be connected to each other electrically.

Since the escape portion 51 is formed by bending a plate-like member, the escape portion 51 can be formed easily by press working.

Although it was stated above that the concave portion 51a is formed as a bent portion of the escape portion 51, the concave portion may be a groove or the like that is formed in the outer surface (i.e., the surface on the side of the second major surface 21d) of a plate-like escape portion so as to extend in the width direction Y.

Second Embodiment

Next, the second embodiment of the invention will be described with reference to FIGS. 18-20. Members and portions having the same ones in the above embodiment will be given the same symbols as the latter and descriptions therefor will be omitted. Only differences will be described.
<Terminal>

Figure 18:
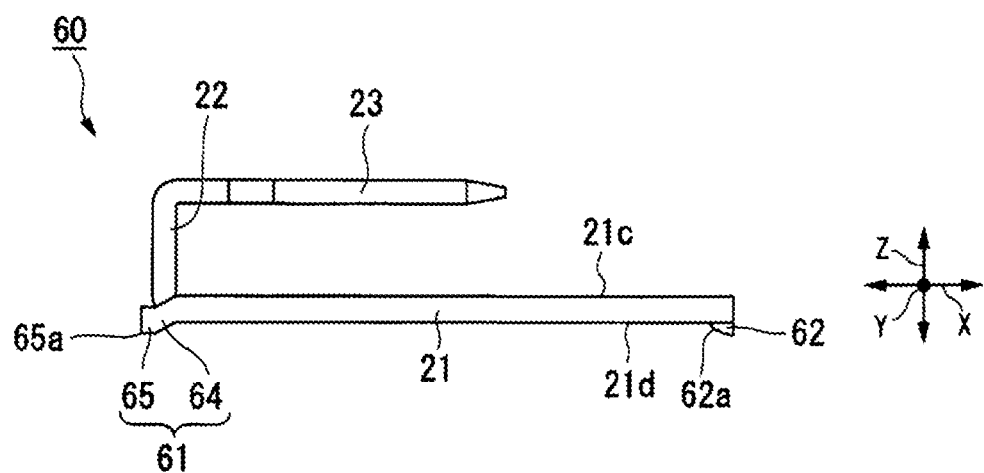
FIG. 18 is a side view of a terminal that is employed a glass plate with terminal according to a second embodiment of the invention.

FIG. 18 is a side view of a terminal 60 employed in this embodiment. FIG. 19 is a plan view of the terminal 60 of the embodiment. FIG. 20 is a front view of the terminal 60 of the embodiment.

Figure 19:
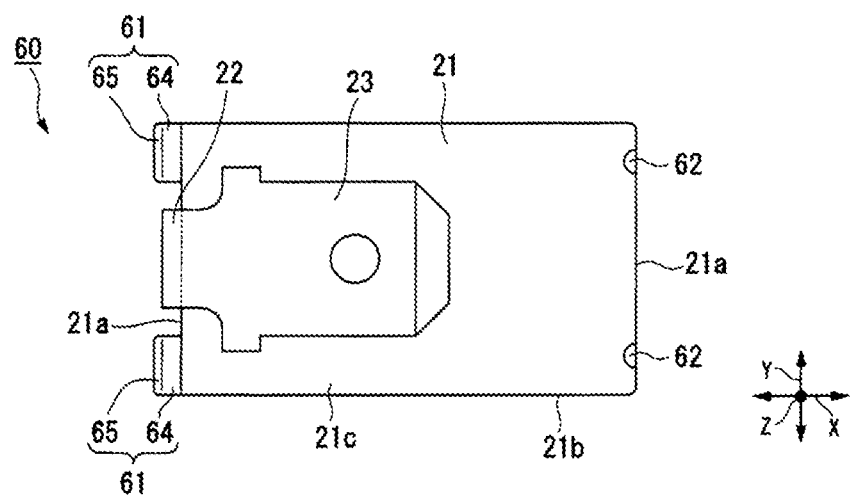
FIG. 19 is a plan view of the same terminal.
Figure 20:
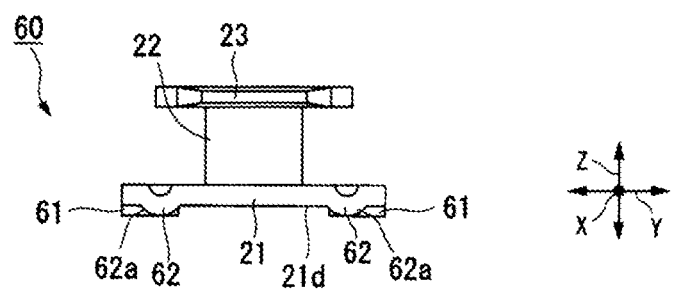
FIG. 20 is a front view of the same terminal.

As shown in FIGS. 18-20, the terminal 60 employed in a glass plate with terminal according to the embodiment is equipped with stoppers 61 and 62 in place of the stoppers 24 and 25 of the terminal 20 of the first embodiment.

The stoppers 61 project in the longitudinal direction X from two respective end portions of one first side 21a located at one end, in the longitudinal direction X, of the base portion 21. Each stopper 61 has a slant portion 64 which extends so as to incline with respect to the longitudinal direction X of the base portion 21 and a support portion 65 which extends from the end of the slant portion 64 in the longitudinal direction X. A bottom surface 65a of the support portion 65 is a flat surface that is parallel with the second major surface 21d of the base portion 21.

Two end portions of the other first side 21a, located at the other end in the longitudinal direction X, of the base portion 21 are provided with the above-mentioned stoppers 62, respectively. An outer surface 62a, located on the side of the second major surface 21d, of each stopper 62 is a curved surface and projects from the second major surface 21d.

The distance in the thickness direction Z between the second major surface 21d of the base portion 21 and the bottom surfaces 65a of the support portions 65 and the distance between the second major surface 21d and the bottoms of the outer surfaces 62a of the stoppers 62 (i.e., the projection length of the outer surfaces 62a) are equal to about 0.4 mm, respectively.

In the terminal 60 of the embodiment, the stoppers 62 can be formed easily by hitting the first major surface 21c of the base portion 21 at end portions of the first side 21a using a punch or the like.

By bringing the stoppers 61 and 62 into contact with or very close to the power supply member 15 of the glass plate 10, the thermosetting adhesive layer 30A and the spring member 35 can be prevented from being compressed excessively in the thickness direction Z.

Third Embodiment

Next, a third embodiment of the invention will be described with reference to FIGS. 21-23. Members and portions having the same ones in the above embodiments will be given the same symbols as the latter and descriptions therefor will be omitted. Only differences will be described.
<Terminal>

Figure 21:
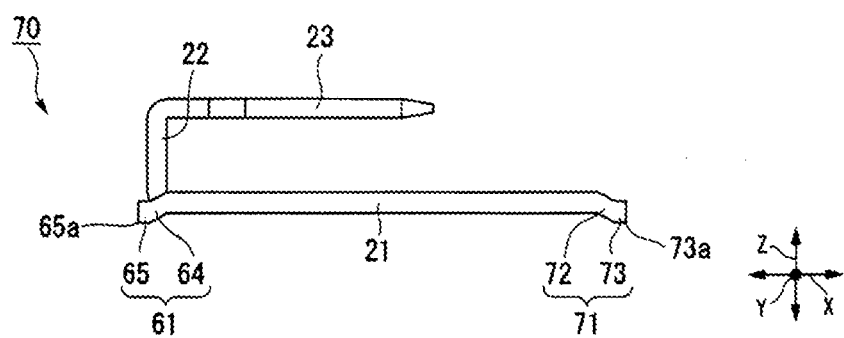
FIG. 21 is a side view of a terminal that is employed a glass plate with terminal according to a third embodiment of the invention.

FIG. 21 is a side view of a terminal 70 employed in this embodiment. FIG. 22 is a plan view of the terminal 70 of the embodiment. FIG. 23 is a front view of the terminal 70 of the embodiment.

Figure 22:
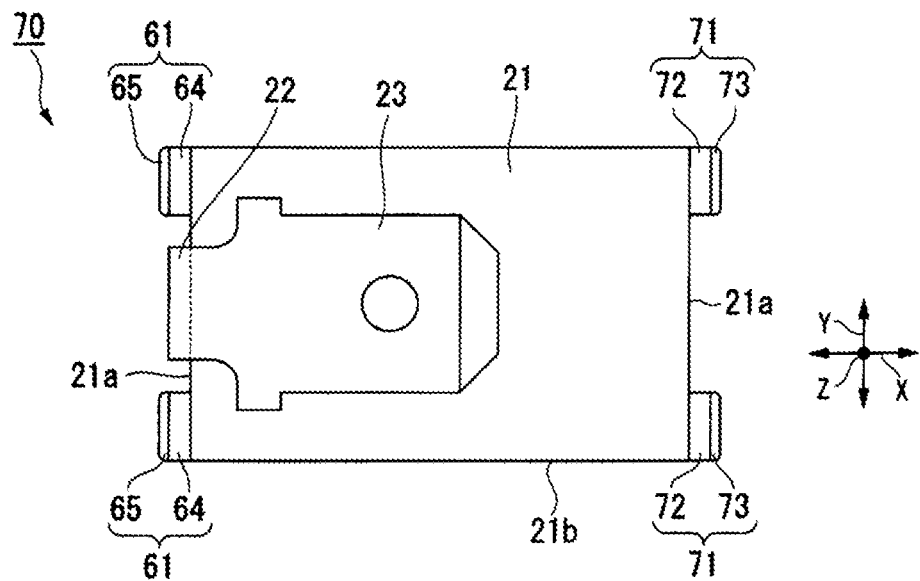
FIG. 22 is a plan view of the same terminal.
Figure 23:
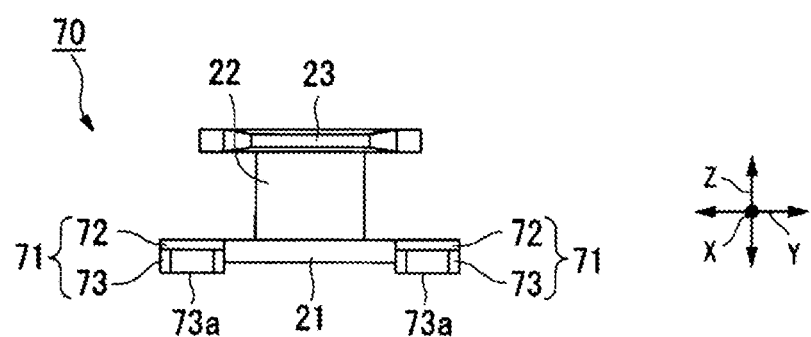
FIG. 23 is a front view of the same terminal.

As shown in FIGS. 21-23, the terminal 70 employed in a glass plate with terminal according to the embodiment is equipped with stoppers 71 in place of the stoppers 62 of the terminal 60 of the second embodiment.

Two end portions of the other first side 21a, located at the other end in the longitudinal direction X, of the base portion 21 are provided with the above-mentioned stoppers 71, respectively. The stoppers 71 are formed in the same manner as the stoppers 61. That is, the stoppers 71 project in the longitudinal direction X from the two respective end portions of the other first side 21a. Each stopper 71 has a slant portion 72 which extends so as to incline with respect to the longitudinal direction X of the base portion 21 and a support portion 73 which extends from the end of the slant portion 72 in the longitudinal direction X. Bottom surfaces 73a of the support portion 73 are flat surfaces that are flush with the bottom surfaces 65a of the support portions 65.

The terminal 70 of the embodiment can provide the same advantages as the terminal 60 of the second embodiment.

Fourth Embodiment

Next, a fourth embodiment of the invention will be described with reference to FIGS. 24-27. Members and portions having the same ones in the above embodiments will be given the same symbols as the latter and descriptions therefor will be omitted. Only differences will be described.
<Terminal>

Figure 24:
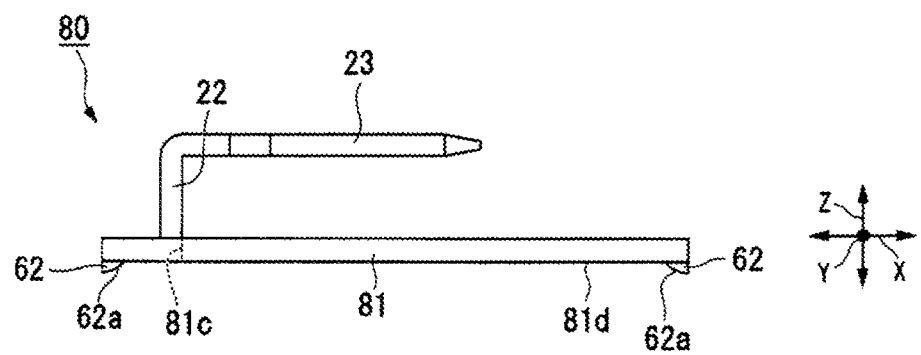
FIG. 24 is a side view of a terminal that is employed a glass plate with terminal according to a fourth embodiment of the invention.
Figure 25:
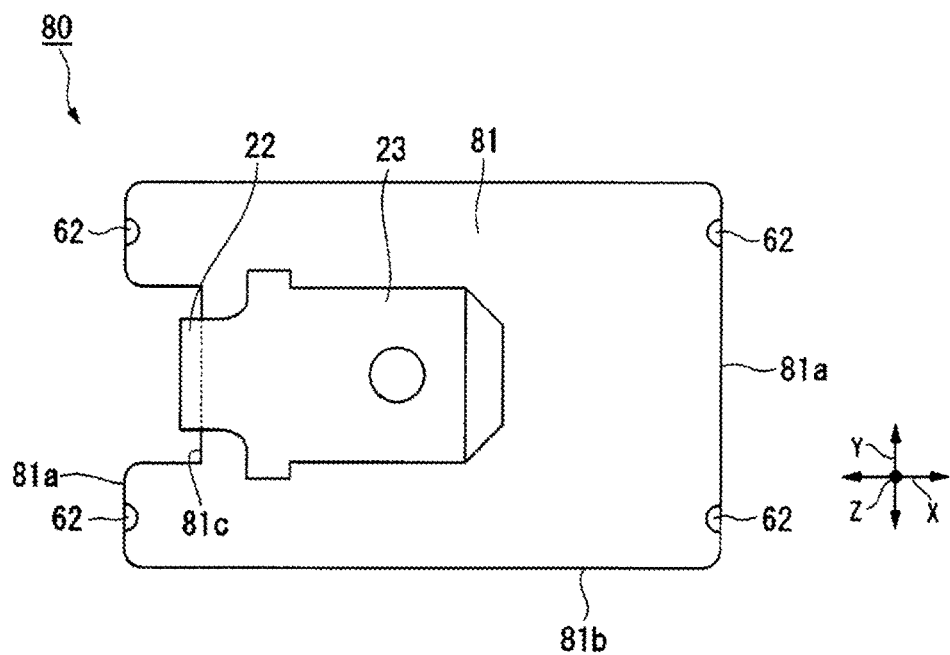
FIG. 25 is a plan view of the same terminal.
Figure 26:
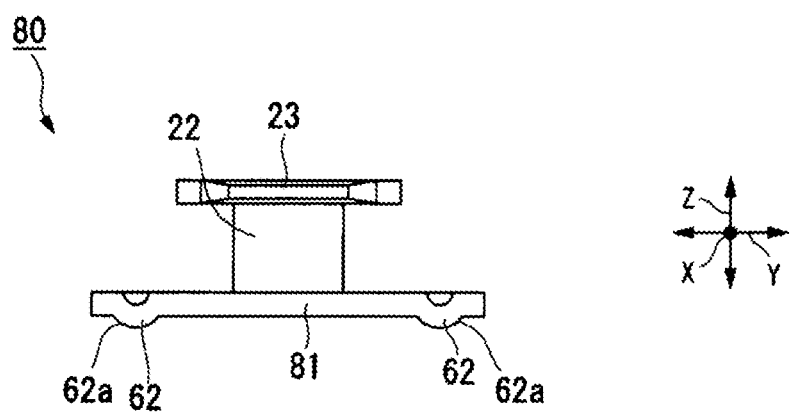
FIG. 26 is a front view of the same terminal.
Figure 27:
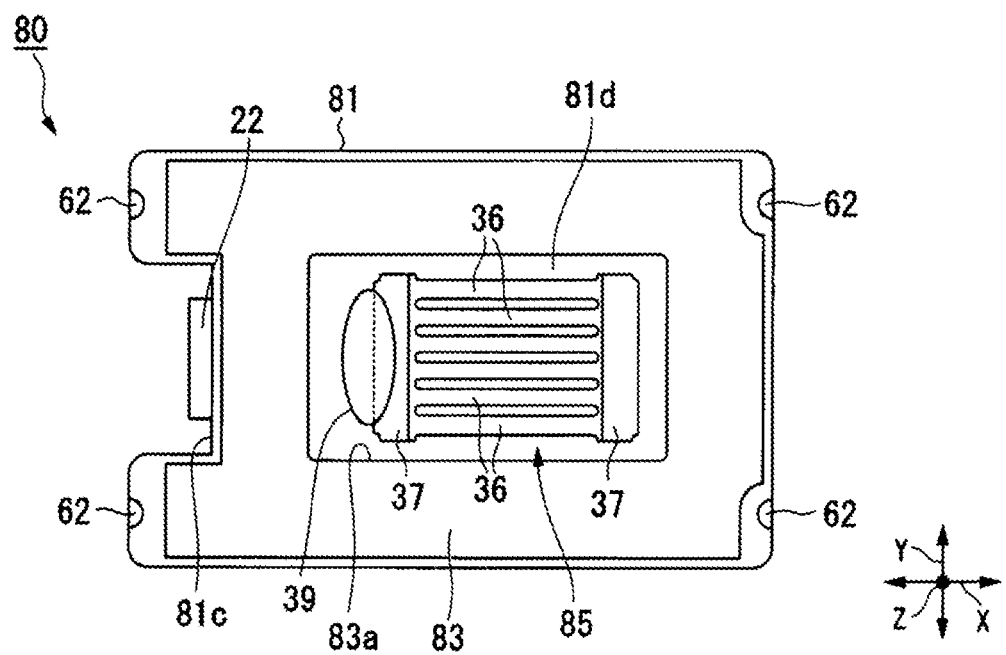
FIG. 27 is a bottom view of the same terminal.

FIG. 24 is a side view of a terminal 80 employed in this embodiment. FIG. 25 is a plan view of the terminal 80 of the embodiment. FIG. 26 is a front view of the terminal 80 of the embodiment. FIG. 27 is a bottom view of the terminal 80 of the embodiment.

As shown in FIGS. 24-26, the terminal 80 employed in a glass plate with terminal according to the embodiment is equipped with a base portion 81 and the above-mentioned stoppers 62 in place of the base portion 21 and the stoppers 24 and 25 of the terminal 20 of the first embodiment.

The base portion 81 is longer than the above-mentioned base portion 21 in the width direction Y and the longitudinal direction X. In the base portion 81, second sides 81b which adjoin first sides 81a and extend in the longitudinal direction X are longer than the first sides 81a which extend in the width direction Y.

One first side 81a that is located at one end, in the longitudinal direction X, of the base portion 81 is formed with a cut 81c which is rectangular in a plan view. The above-mentioned support portion 22 is erected in the thickness direction Z from the deep end of the cut 81c (i.e., the end, on the side of the other end of the base portion 81 in the longitudinal direction X).

The above-mentioned stoppers 62 are formed at two pairs of end portions of the first sides located at the one end and the other end, in the longitudinal direction X, of the base portion 81.
<Adhesive Layer and Spring Member>

As shown in FIG. 27, in a plan view, an adhesive layer 83 is shaped like a frame having a rectangular outline. The outer circumference of the adhesive layer 83 is parallel with that of a second major surface 81d of the base portion 81.

A spring member 85 is disposed on the second major surface 81d of the base portion 81 in a hollow space 83a of the adhesive layer 83. The spring member 85 has six curved portions 36.

The terminal 80 having the above structure not only provides the same advantages as the terminal 60 of the second embodiment but also allows a flow of a larger current because the number of curved portions 36 is larger than the terminals of the above embodiments.

Although the first to fourth embodiments of the invention have been described above in detail with reference to the drawings, specific configurations are possible that are different than in these embodiments. Changes in configuration, different combinations of members and portions, deletion of a certain member(s) or portion(s), etc. are possible without departing from the scope of the invention. Furthermore, it goes without saying that parts of the configurations of some embodiments can be combined together as appropriate.

Figure 28:
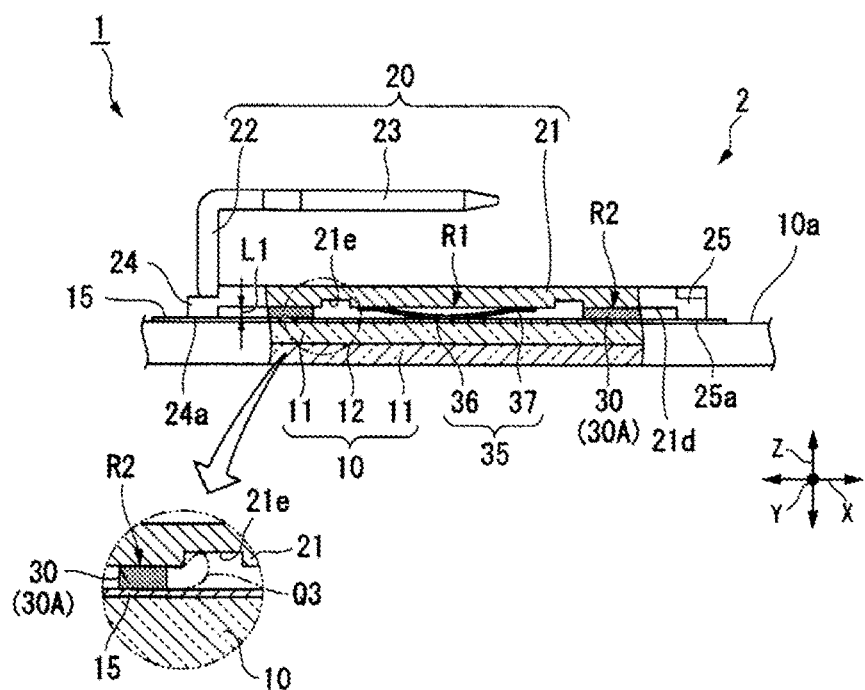
FIG. 28 is a side sectional view of a glass plate with terminal according to a variation of the embodiment of the invention.
Figure 29:
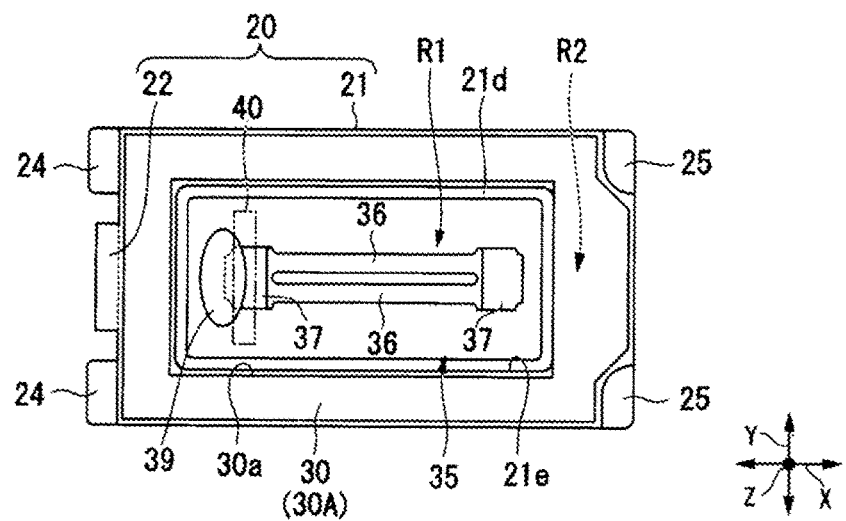
FIG. 29 is a bottom view of the same glass plate with terminal.

For example, in the first embodiment, as shown in FIGS. 28 and 29, in the above-described first embodiment, as shown in FIGS. 28 and 29, a groove 21e may be formed between a region R1 where the spring member 35 is disposed on the second major surface 21d of the base portion 21 and a region R2 where the adhesive layer 30 is applied. Although the groove 21e may be formed adjacent to part of the circumference of the spring member 35, it is preferable that the groove 21e be formed so as to surround the entire circumference of the spring member 35. Since the pressure in the autoclave is higher than in the hollow space of the thermosetting adhesive layer 30A, the compressed thermosetting adhesive layer 30A is moved toward the hollow space. Part of the thermosetting adhesive layer 30A that has moved to a hollow-space-side position Q3 (see the enlarged inset in FIG. 28) goes into the groove 21e. Thus, the thermosetting adhesive layer 30A can be prevented to come into contact with the spring member 35 without increasing the distance between the thermosetting adhesive layer 30A and the spring member 35, i.e., increasing the size of the base portion 21.

The same measure is also possible in the second to fourth embodiments.

For example, in the first to fourth embodiments, each curved portion 36 is in contact with the base portion 21 at two points and with the power supply member 15 at one point. An alternative structure is possible that both end portions 36a of each curved portion 36 and both flat portions 37 are in contact with the power supply member 15 and the central portion 36b of each curved portion 36 is in contact with the second major surface 21d of the base portion 21. That is, each curved portion 36 may be in contact with the power supply member 15 at two points and with the base portion 21 at one point.

Although the adhesive layer is formed so as to surround the spring member entirely, the adhesive layer may be formed so as to surround part of the spring member. The electric connection structure need not always be provided with the adhesive layer.

The area of the power supply member 15 may be smaller than that of the base portion 21, in which case the bottom surfaces 24a and 25a of the stoppers 24 and 25 of the terminal 20 are in contact with the glass plate 10.

The flat portions 37 need not always be formed in the spring member. This is because the spring member 35 can be fixed tentatively to the base portion 21 by positioning the spring member 35 with respect to the second major surface 21d of the base portion 21 using a proper jig.

The stoppers need not always be formed in the terminal. This is because deformation of the curved portions 36 of the spring member 35 and the thermosetting adhesive layer 30A can be prevented using the pads and bosses described in Patent document 1.

The terminal may be a connector terminal that has plural base portions 21 so as to be mounted bridging plural power supply members 15.

The terminal is not limited to ones having a terminal portion that complies with JIS, and may be such as to have a terminal portion being in an arbitrary form. The form of the terminal portion is not limited to a male type and may be a female type.

The terminal is not limited to ones that are used for connecting the power supply member 15 of the glass plate 10 to an electric wire, and may be ones that are used for connecting the power supply member 15 of the glass plate 10 to another conductive portion (e.g., a grounding member for electrically connecting the power supply member of the glass plate to a vehicle body).

The terminal may be in such a form as to have the base portion 21 but have neither the support portion 22 nor the male terminal portion 23 extending from the tip of the support portion 22. In this case, an appropriate measure is to attach a conductive member such as an electric wire, another terminal having the same structure as in the embodiments, or a terminal with an electric wire to the first major surface 21c of the base portion 21 by means of a conductive fixing member (e.g., lead-free solder).

The glass plate 10 is not limited to a vehicle windshield and may be a rear glass, a side glass, or a roof glass. Furthermore, the uses of the glass plate 10 are not limited to the vehicle use; the glass plate 10 may be used with building materials or in electronic devices.

DESCRIPTION OF REFERENCE NUMERALS AND SIGNS

1: Glass plate with terminal
2: Electric connection structure
10: Glass plate
11: Glass single plate
12: Intermediate film
15: Power supply member
20, 60, 70, 80: Terminal
21, 81: Base portion
21d: Second major surface (major surface)
21e: Groove
24, 25, 61, 62, 71: Stopper (projection portion)
30, 83: Adhesive layer
30A: Thermosetting adhesive layer
35, 45, 50, 85: Spring member
36: Curved portion
36a: End portion
36b: Central portion
37: Flat portion
51: Escape portion
51a: Concave portion
51b: Central portion
Q1: Reference plane
R1, R2: Region
S30: Terminal disposing step (first step)
S32: Main compression-bonding step (second step)
S32a: Softening step
S32b: Setting step
X: Longitudinal direction (first direction)
Z: Thickness direction

The invention claimed is:

1. An electric connection structure comprising:
a glass plate;
a power supply member formed on the glass plate;
a terminal having a base portion which is opposed to the glass plate; and
a spring member which is made of a conductor and disposed between the power supply member and the base portion, wherein:
the spring member is formed into a plate-like shape extending in a first direction, and a central portion in the first direction of the spring member is curved so as to be convex in a thickness direction of the glass plate so that the spring member has a curved portion, and
the power supply member and the base portion contact with the spring member, thereby establishing electric continuity between the power supply member and the base portion via the spring member.

2. The electric connection structure according to claim 1, further comprising an adhesive layer which bonds at least one of the glass plate and the power supply member to the base portion.

3. The electric connection structure according to claim 1, wherein:
a central portion of the curved portion is in contact with one of the power supply member and the base portion; and
two end portions of the curved portion in the first direction are in contact with the other of the power supply member and the base portion.

4. The electric connection structure according to claim 3, wherein:

the central portion of the curved portion is in contact with the power supply member; and the two end portions of the curved portion in the first direction are in contact with the base portion.

5. The electric connection structure according to claim 3, wherein:

the spring member has an escape portion which is formed with a concave portion; and the concave portion is concaved toward a side toward which the curved portion is curved so as to be convex, from a reference plane that includes surfaces of the two end portions of the curved portion.

6. The electric connection structure according to claim 5, wherein the escape portion is formed into a plate-like shape extending in the first direction, and is curved in such a manner that a central portion of the escape portion in the first direction is convex toward the side toward which the curved portion is curved so as to be convex.

7. The electric connection structure according to claim 3, wherein the spring member has a flat portion which is disposed at least one end of the curved portion in the first direction and extends in the first direction.

8. The electric connection structure according to claim 1, wherein:

the base portion is formed into a plate-like shape; and projection portions which project from a major surface of the base portion, are in contact with at least one of the glass plate and the power supply member, and prevent the spring member interposed between the power supply member and the base portion from deforming to a prescribed degree or more.

9. The electric connection structure according to claim 2, wherein the adhesive layer is disposed so as to surround the spring member.

10. The electric connection structure according to claim 2, wherein:

the base portion is formed into a plate-like shape; and a major surface of the base portion has a groove formed between a region where the spring member is disposed and a region where the adhesive layer is formed.

11. A glass plate with terminal, having the electric connection structure according to claim 1.

12. A method for manufacturing a glass plate with terminal, comprising:

a first step of disposing a spring member made of a conductor between a power supply member of a glass plate and a base portion of a terminal; and a second step of compressing the spring member in a thickness direction of the glass plate, wherein:

the spring member is formed into a plate-like shape extending in a first direction, and a central portion in the first direction of the spring member is curved so as to be convex in a thickness direction of the glass plate so that the spring member has a curved portion, and the power supply member and the base portion contact with the spring member, thereby establishing electric continuity between the power supply member and the base portion via the spring member.

13. The method for manufacturing a glass plate with terminal according to claim 12, wherein:

the first step forms a thermosetting adhesive layer between at least one of the glass plate and the power supply member and the base portion; and the second step forms an adhesive layer by heating and setting the thermosetting adhesive layer while the thermosetting adhesive layer is in a state of being compressed in the thickness direction.

14. The method for manufacturing a glass plate with terminal according to claim 13, wherein the second step comprises:

a softening step of softening the thermosetting adhesive layer first by heating it; and a setting step of setting the thermosetting adhesive layer by heating it while it is in a compressed state.

15. The method for manufacturing a glass plate with terminal according to claim 13, wherein:

the glass plate is a laminated glass formed by bonding plural glass single plates via an intermediate film or films; and the first step and the second step are performed after a heat-bonding step of heating and bonding the plural glass single plates and the intermediate film or films together.

16. The method for manufacturing a glass plate with terminal according to claim 12, wherein:

the spring member has a flat portion which is disposed at least one end of the curved portion in the first direction and extends in the first direction, two end portions of the curved portion and the flat portion are made into contact with a major surface of the base portion, and the central portion of the curved portion is made into contact with the power supply member.

17. The method for manufacturing a glass plate with terminal according to claim 12, wherein:

the spring member is unitized portions formed by punching and pressing a plate material made of a metal.

18. The electric connection structure according to claim 1, wherein the spring member is made of a metal.

* * * * *